United States Patent [19]
Schaller

[11] 3,741,560
[45] June 26, 1973

[54] DAMPENED SHOCK ABSORBING BUMPER
[75] Inventor: Albert L. Schaller, Clarkston, Mich.
[73] Assignee: General Motors Corporation, Detroit, Mich.
[22] Filed: Sept. 1, 1971
[21] Appl. No.: 176,830

[52] U.S. Cl............... 267/134, 188/1 R, 213/43, 213/221, 267/140, 293/70, 293/85, 293/88, 293/89
[51] Int. Cl....... B60r 19/02, B61f 19/04, F16f 7/08
[58] Field of Search.................. 188/1 B, 1 C, 1 D, 188/1 R, 268, 317; 213/43, 221, 222; 267/134, 135, 139, 140; 293/70, 85, 88, 89

[56] References Cited
UNITED STATES PATENTS

| | | | |
|---|---|---|---|
| 996,207 | 6/1911 | Brown et al. | 293/88 X |
| 1,648,394 | 11/1927 | Gates | 293/85 |
| 2,917,265 | 12/1959 | Markowski | 267/134 X |
| 3,053,526 | 9/1962 | Kendall | 188/268 X |
| 3,140,080 | 7/1964 | Rumsey | 267/134 |
| 3,379,317 | 4/1968 | Carlson | 267/134 X |
| 3,379,319 | 4/1968 | Stasieluk | 188/268 X |

Primary Examiner—Drayton E. Hoffman
Assistant Examiner—Howard Beltran
Attorney—W. E. Finken and D. L. Ellis

[57] ABSTRACT

An impact energy absorbing device includes a cylinder, a generally cup-shaped friction shoe slidable in the cylinder, a ram received in one end of the cylinder and having a bullet-shaped nose which is slidably received in the cup-shaped friction shoe, an elastomeric material filling a space between the bullet-shaped nose and the friction shoe, and spring means acting between the friction shoe and the other end of the cylinder to yieldably resist telescoping movement of the ram and friction shoe into the cylinder upon application of impact force thereto so that the friction shoe is radially expanded against the cylinder by radial displacement of the elastomeric material.

3 Claims, 3 Drawing Figures

PATENTED JUN 26 1973 3,741,560

INVENTOR.
Albert L. Schaller
BY
D. L. Ellis
ATTORNEY

DAMPENED SHOCK ABSORBING BUMPER The invention relates to an improved energy absorbing device and more particularly to an energy absorbing device in which axial movement between telescopable impact receiving members is retarded by engagement of a friction shoe carried by one of the members against the wall of the other of the members.

It is advantageous in automotive vehicle collapsible steering column assemblies and bumper mounts, and in diverse other applications, to provide a mechanism capable of absorbing kinetic impact energy. Furthermore, it is desirable to provide an impact energy absorbing device which restores itself to its pre-impact condition so that it may repeat its energy absorbing function upon subsequent impacts. It is also desirable that an energy absorber provide maximum energy absorbing effectiveness by providing a uniform resistance to movement between impact receiving bodies through the entire distance of such movement.

The invention features an impact energy absorbing device including a pair of tubular members or cylinders arranged for telescopic movement relative one another upon application of impact force thereto. A generally cup-shaped friction shoe is slidable within the outer of the telescoped cylinders and the axially extending walls thereof are preferably slotted to promote expansion of the friction shoe against the walls of the outer cylinder. The end of the inner cylinder forms a ram with a bullet-shaped nose which is slidably received within the cup-shaped friction shoe. A solid elastomeric material fills a space between the bullet-shaped nose and the friction shoe. Microcellular foam filling the space between the outer cylinder and the friction shoe member yieldably resists telescoping movement of the inner cylinder and friction shoe into the outer cylinder. The inertial and static frictional resistance of the friction shoe to initial telescoping movement thereof causes the bullet-nosed ram to mechanically cam elastomeric material radially outward forcing the walls of the friction shoe to engage the walls of the outer tube and thereby immediately provide a considerable braking effect between the cylinders. Furthermore, the axial compression of the fixed volume of incompressible elastomeric material as the foam yields causes outward radial displacement of the elastomer in a hydraulic sense to provide a further radially expanding force on the friction shoe. Thus, it may be seen that the various elements of the shock absorbing mechanism may be designed to provide a relatively constant frictional force between the friction shoe and the outer tube so that maximum energy absorbing effectiveness is achieved. When the impact force is relieved, so is the radial displacing force on the elastomeric material so that the microcellular foam spring may return the components of the dampened shock absorber to their pre-impact positions.

These and other features of the invention will be readily apparent from the following specification and from the drawings in which.

Figure 1:
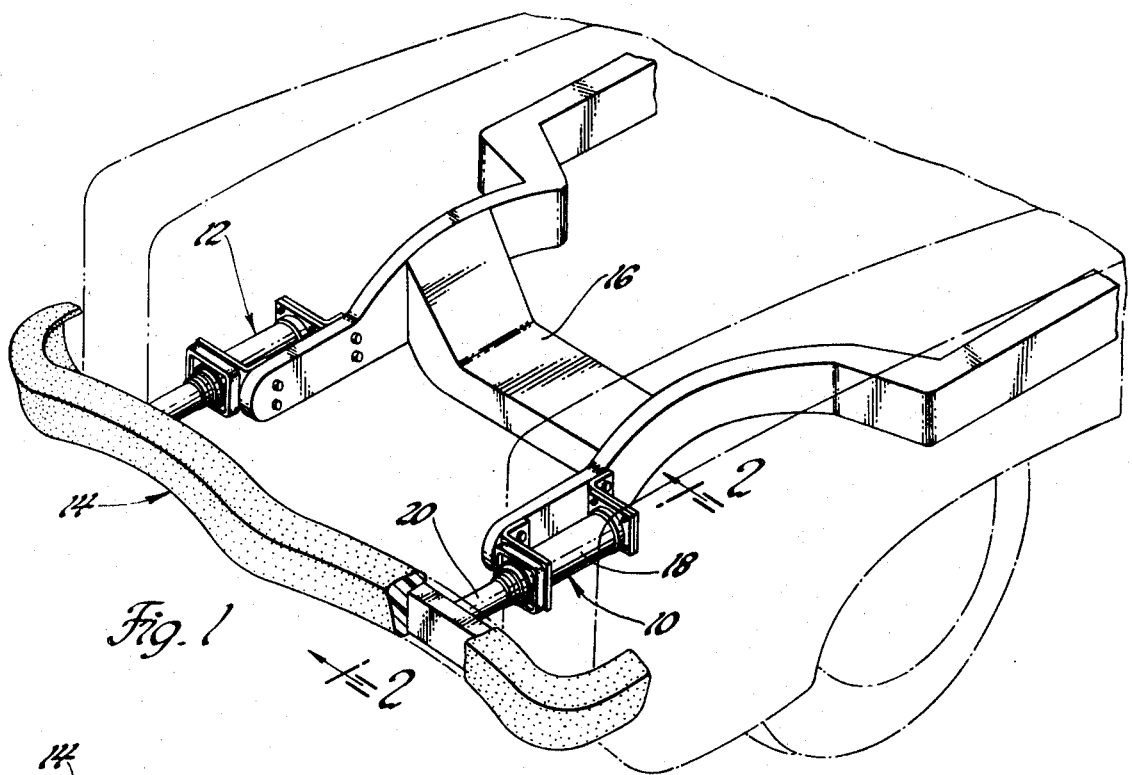
FIG. 1 is a perspective view having parts broken away and in section showing a pair of energy absorbing devices embodying the invention and arranged in connection between a vehicle frame member and a bumper assembly.

Referring to FIG. 1, the invention is shown arranged for use within an energy absorbing bumper system, a use for which the invention is particularly well suited, although by no means limited. A pair of energy absorbing devices, generally indicated at 10 and 12, are constructed according to the invention and mount a bumper or impact bar 14 to a vehicle frame member 16. The energy absorbers 10 and 12 are laterally spaced either side of the longitudinal center line of the vehicle.

Figure 2:
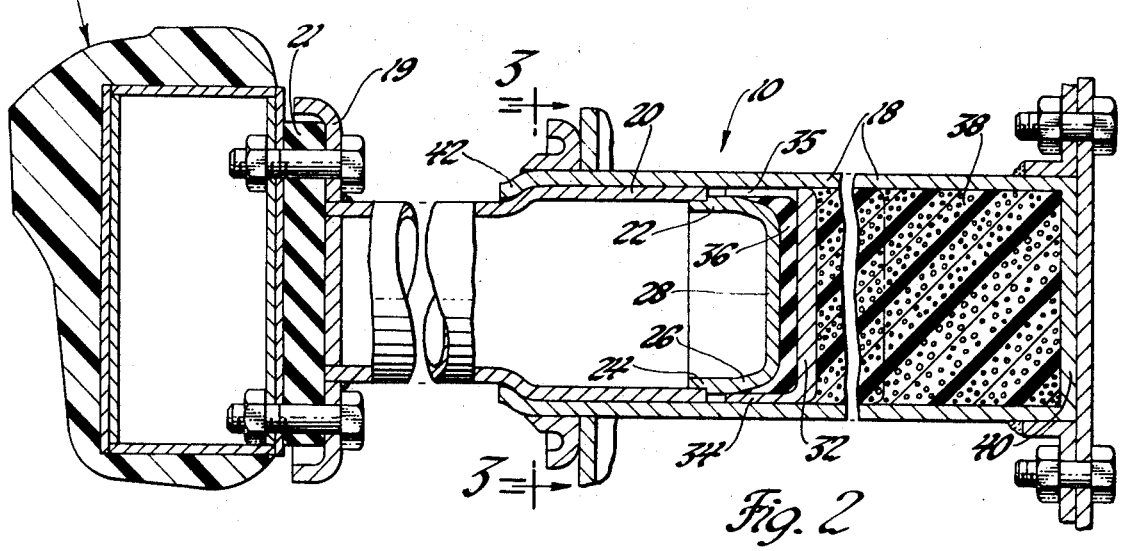
FIG. 2 is a longitudinal section view taken in the direction of the arrows 2—2 of FIG. 1.
Figure 3:
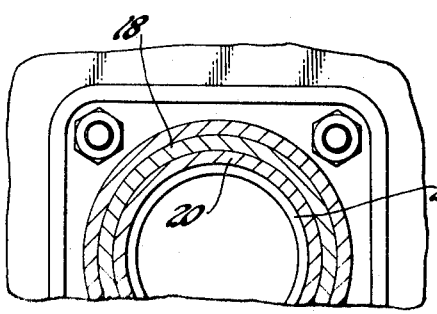
FIG. 3 is a cross-sectional view taken in the direction of arrows 3—3 of FIG. 2.

With reference to FIG. 2, the energy absorber 10, the following description of which will be understood as applying identically to energy absorber 12, includes an outer tubular member or cylinder 18 suitably connected to frame 16 as by bolting, and an inner tubular member or cylinder 20 connected to the bumper 14 as by a flange 19 bolted to the bumper 14 through an elastomeric pad 21. The cylinders are arranged generally concentrically with the inner cylinder 20 extending inside the outer cylinder 18 so that cylinder 18 slidably guides cylinder 20 during relative telescoping movement therebetween. A ram 22 is attached to the inner cylinder 20 and has a generally bullet-shaped nose including a generally axially extending wall 24, a ramped wall 26, and a blunt end wall 28.

A generally cup-shaped friction shoe 32 is located within the outer cylinder 18 and includes a cylindrical wall portion 34. The inner surface of wall 34 is slidably engaged by the outer surface of axially extending wall 24 of ram 22. The outer surface of cylindrical portion 34 of friction shoe 32 slidably engages the outer cylinder 18. The cylindrical wall portion 34 is preferably slotted at circumferential intervals as at 35 so that the friction shoe member 32 is readily expandable in the radial direction.

A spreader 36 consisting of an elastomer or an incompressible material with relatively low modulus of elasticity fills a void between the ram 22 and the friction shoe 32. Microcellular foam 38 fills the space between the friction shoe 32 and the closed end 40 of outer cylinder 18.

The energy absorber 10 is shown in FIG. 2 in its unimpacted condition wherein the microcellular foam 38 is somewhat compressed from its free state so that it exerts a force through friction shoe 32, spreader 36, and ram 22 to urge inner cylinder 20 into engagement with a crimped portion 42 of outer cylinder 18.

In operation, when the bumper 14 collides with a resisting object, the energy absorbers 10 and 12 are loaded in axial compression by the impact force, causing inner cylinder 20 to telescope into outer cylinder 18. The sudden telescoping movement of inner cylinder 20 and ram 22 by the impact force tries to move spreader 36 and the friction shoe 32. The preload of the microcellular foam 38, the static frictional force of the cylindrical walls 34 against the outer tube 18, and the inertia of the friction shoe 32 and spreader 36 combine to resist such movement and result in an immediate radially outward camming of the cylindrical walls 34 by virtue of the action of ramp surface 26 against the portion of the spreader 36 interposed between ramp surface 26 and cylindrical wall 34. Thus, a considerable radially expanding force is exerted against the wall 34 which is in turn forced into increased frictional engagement with cylinder 18 so that the force resisting telescoping movement of inner cylinder 20 builds rapidly. As inner cylinder 20 is forcibly telescoped into cylinder 18 the axial compression of the fixed volume of incompressible spreader 36 between the blunt end 28 of the ram 22 and the friction shoe 32 as the microcellular foam 38 yields results in radially outward displacement of the spreader 36 to provide what may be termed a hydraulic force urging the cylindrical wall 34 into increased frictional engagement with outer tube 18. While a conventional mechanical spring may be used in place of the microcellular foam, the foam is preferable inasmuch as it provides a relatively constant spring rate under dynamic load conditions and thereby improves the energy absorbing effectiveness of the device.

When the impact force is relieved from the bumper 14 and frame member 16, the spreader 36 pushes ram 22 axially out of the friction shoe 32 thereby relieving the force on the spreader so that in turn the force on the cylindrical walls 34 of friction shoe 32 is relieved. The energy stored in the compressed microcellular foam 38 can then urge shoe 32 and spreader 36, ram 22 and inner tube 20 to their pre-impact axial positions as shown in FIG. 2.

What is claimed is:

1. An energy absorber comprising:

a tubular member;

a generally cup-shaped friction shoe slidable in the tubular member and radially expandible to frictionally engage the walls thereof;

a ram slidably guided in the tubular member and having a bullet-nosed end slidably received in the cup-shaped friction shoe, the ram being telescopable within the tubular member when subjected to impact forces;

a spreader of relatively incompressible material of low elastic modulus filling the space between the ram and the cup-shaped friction shoe;

and spring means acting between the friction shoe member and the other end of the tubular member and yieldably resisting movement of the friction shoe into the tubular member when impact force telescopes the ram into the tubular member whereby the bullet-nosed end of the ram radially cams the spreader against the cup-shaped friction shoe member and also axially compresses the spreader causing radial displacement thereof to force the friction shoe member against the cylinder whereby telescoping movement of the ram into the tubular member is impeded.

2. An energy absorber comprising:

a cylinder;

a generally cup-shaped friction shoe slidable in the cylinder, the walls thereof being slit at circumferential intervals to permit radial expansion into frictional engagement with the cylinder;

a ram slidably guided in the cylinder and having a bullet-nosed end slidably received in the cup-shaped friction shoe, the ram being telescopable within the cylinder when subjected to impact forces;

an elastomeric spreader filling the space between the ram and the cup-shaped friction shoe;

and spring means acting between the friction shoe and the other end of the cylinder and yieldably resisting movement of the friction shoe into the cylinder when impact force telescopes the ram into the cylinder whereby the bullet-nosed end cams the spreader radially outward against the walls of the friction shoe and also axially compresses the spreader causing further radial displacement thereof to load the friction shoe against the cylinder and thereby impede telescoping movement between the cylinder and the ram.

3. An energy absorber comprising:

a cylinder;

a generally cup-shaped friction shoe slidable in the cylinder and having walls frictionally engageable with the walls of the cylinder;

a ram slidably guided in the cylinder and having a bullet-nosed end slidably received in the cup-shaped friction shoe, the ram being telescopable within the cylinder when subjected to impact forces;

an elastomeric spreader filling the space between the ram and the cup-shaped friction shoe;

and microcellular foam filling the space between the friction shoe and the other end of the cylinder and yieldably resisting movement of the friction shoe into the cylinder when impact force telescopes the ram into the cylinder whereby the bullet-nosed end cams the spreader radially outward against the friction shoe and also axially compresses the spreader causing further radial displacement thereof to load the friction shoe against the cylinder and thereby impede telescoping movement between the cylinder and the ram.

* * * * *

UNITED STATES PATENT OFFICE
CERTIFICATE OF CORRECTION

Patent No. 3,741,560          Dated June 26, 1973

Inventor(s) Albert L. Schaller

It is certified that error appears in the above-identified patent and that said Letters Patent are hereby corrected as shown below:

Column 3, line 37, delete "member" and "other"; Column 3, line 43 delete "member; Column 3, line 45 delete "cylinder", and insert --tubular member--. Column 4, line 14, delete "other"; Column 4, line 38, delete "other".

Signed and sealed this 6th day of August 1974.

(SEAL)
Attest:

McCOY M. GIBSON, JR.          C. MARSHALL DANN
Attesting Officer          Commissioner of Patents